(12) United States Patent
Zhao et al.

(10) Patent No.: US 12,225,063 B2
(45) Date of Patent: Feb. 11, 2025

(54) METHOD, APPARATUS, AND COMPUTER-READABLE STORAGE MEDIUM FOR CROSS-DOMAIN INTERNET OF THINGS DEVICE REGISTRATION

(71) Applicants: BEIJING BOE TECHNOLOGY DEVELOPMENT CO., LTD., Beijing (CN); BOE TECHNOLOGY GROUP CO., LTD., Beijing (CN)

(72) Inventors: Junjie Zhao, Beijing (CN); Qian Zhang, Beijing (CN); Jing Su, Beijing (CN); Yanqiu Zhao, Beijing (CN)

(73) Assignees: BEIJING BOE TECHNOLOGY DEVELOPMENT CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 814 days.

(21) Appl. No.: 17/426,158

(22) PCT Filed: Jan. 31, 2020

(86) PCT No.: PCT/CN2020/074086
§ 371 (c)(1),
(2) Date: Jul. 28, 2021

(87) PCT Pub. No.: WO2020/156502
PCT Pub. Date: Aug. 6, 2020

(65) Prior Publication Data
US 2022/0166810 A1  May 26, 2022

(30) Foreign Application Priority Data
Feb. 2, 2019 (CN) .......................... 201910106726.6

(51) Int. Cl.
H04L 65/1073 (2022.01)
H04L 9/40 (2022.01)
H04L 67/12 (2022.01)

(52) U.S. Cl.
CPC ...... *H04L 65/1073* (2013.01); *H04L 63/0876* (2013.01); *H04L 63/126* (2013.01); *H04L 67/12* (2013.01)

(58) Field of Classification Search
CPC .... H04L 63/0876; H04L 63/126; H04L 67/12
(Continued)

(56) References Cited

U.S. PATENT DOCUMENTS

| 2012/0011571 A1* | 1/2012 | Moroney | H04N 21/43615 726/4 |
| 2015/0215788 A1* | 7/2015 | Liu | H04L 63/08 455/501 |
| 2018/0173609 A1 | 6/2018 | Tang et al. | |

FOREIGN PATENT DOCUMENTS

| CN | 102025577 A | | 4/2011 |
| CN | 105450593 A | * | 3/2016 |
| CN | 106375442 A | | 2/2017 |

OTHER PUBLICATIONS

CN105450593A (Year: 2016).*

* cited by examiner

*Primary Examiner* — Christopher M Crutchfield
*Assistant Examiner* — Jean F Voltaire
(74) *Attorney, Agent, or Firm* — Dilworth & Barrese, LLP.; Michael J. Musella, Esq.

(57) ABSTRACT

A health administration method, a health administration apparatus, a health administration system, and a data collection apparatus are provided. The health administration method involves a plurality of objects and a plurality of devices, and includes: generating a device usage record of at (Continued)

least one object based at least on identity information of the at least one object among the plurality of objects and data generated by a device used by the at least one object (S10), and providing the device usage record of the at least one object to a memory associated with a health administration apparatus (S20). The health administration method, the health administration apparatus, the health administration system, and the data collection apparatus can improve work efficiency of medical workers.

15 Claims, 6 Drawing Sheets

(58) Field of Classification Search
USPC .......................................................... 370/328
See application file for complete search history.

200

S201: Sending, by the first server, a verification request for the device identification and/or the device type to a second server S202: Responding, by the first server, that the registration is successful after all of the user identification, the device identification, and/ or the device type are successfully verified, where the second server and the first Internet of Things device are in a same domain

S301: Sending, by a first Internet of Things device, a registration request carrying a user identification to a first server S302: Receiving a response sent by the first server that registration is successful after verification is successful, where the first server and the first Internet of Things device are in different domains

Fig. 3

METHOD, APPARATUS, AND COMPUTER-READABLE STORAGE MEDIUM FOR CROSS-DOMAIN INTERNET OF THINGS DEVICE REGISTRATION

CROSS REFERENCE TO RELATED APPLICATIONS

This application claims priority to Chinese patent application No. 201910106726.6 filed on Feb. 2, 2019, which is incorporated herein by reference in its entirety as a part of the present application.

TECHNICAL FIELD

The present disclosure relates to cross-domain device registration, and in particular to a method, an apparatus, and a computer-readable storage medium for cross-domain Internet of Things device registration.

BACKGROUND

With a development of the Internet of Things technology, more and more devices have networking functions. A device accesses a server by means of registration to obtain various services provided by the server. At present, there are mainly two ways for device registration: the first is to register a user firstly and then add a device, and registration of the device is realized through a unique identifier carried by the device; the second is that the device carries device information and sends a registration request directly to the server, and the server completes the registration after verifying the device information. However, devices of different types of business systems in the prior art cannot communicate with each other, causing information jams between the devices.

SUMMARY OF THE DISCLOSURE

According to an aspect of the present disclosure, there is provided a method for cross-domain Internet of Things device registration, comprising: obtaining, by a first server, a user identification; receiving, by the first server, a registration request carrying a user identification sent by a first Internet of Things device, wherein the first server and the first Internet of Things device are in different domains; and responding, by the first server, whether registration is successful by verifying whether the user identification is correct.

According to an aspect of the present disclosure, wherein after the first server receives the registration request of the first Internet of Things device, the first server compares the received user identification sent by the first Internet of Things device with the user identification obtained by the first server, and responds whether the registration is successful according to a comparison result.

According to an aspect of the present disclosure, wherein the registration request further includes a device identification and/or a device type, and the first server determines a target device associated with the first Internet of Things device according to the device identification and/or the device type.

According to an aspect of the present disclosure, wherein the first server decides a user identification type according to the user identification, and determines an access right of the first Internet of Things device to the target device according to the user identification type.

According to an aspect of the present disclosure, wherein the first server sends a verification request for the device identification and/or the device type to a second server, and the first server responds that the registration is successful after all of the user identification, the device identification, and/or the device type are successfully verified, wherein the second server and the first Internet of Things device are in a same domain.

According to an aspect of the present disclosure, wherein the first server may register with a user server, so that the user server establishes a registration resource including a first server identification and a first server access identification.

According to an aspect of the present disclosure, wherein the registration resource further includes a second server identification and a second server access identification, and the first server access identification is sent to the first Internet of Things device via the second server before the first server receives the registration request sent by the first Internet of Things device.

According to an aspect of the present disclosure, wherein a first server access identification is sent to the first Internet of Things device before the first server receives the registration request sent by the first Internet of Things device.

According to another aspect of the present disclosure, there is provided a method for cross-domain Internet of Things device registration, comprising: sending, by a first Internet of Things device, a registration request carrying a user identification to a first server, and receiving a response sent by the first server that registration is successful after verification is successful, wherein the first server and the first Internet of Things device are in different domains.

According to an aspect of the present disclosure, wherein the registration request further includes a device identification and/or a device type of the first Internet of Things device, so that the first server determines a target device associated with the first Internet of Things device according to the device identification.

According to an aspect of the present disclosure, wherein the first Internet of Things device receives a first server access identification via a second server before the first Internet of Things device sends the registration request to the first server, wherein the second server and the first Internet of Things device are in a same domain.

According to an aspect of the present disclosure, wherein the first Internet of Things device obtains a first server access identification before the first Internet of Things device sends the registration request to the first server.

According to another aspect of the present disclosure, there is provided an apparatus for cross-domain Internet of Things device registration, comprising: a processor; and a memory having computer-readable program instructions stored therein, wherein when the computer-readable program instructions are executed by the processor, a method for cross-domain Internet of Things device registration is performed, and the method comprises: obtaining, by a first server, a user identification; receiving, by the first server, a registration request carrying a user identification sent by a first Internet of Things device, wherein the first server and the first Internet of Things device are in different domains; and responding, by the first server, whether registration is successful by verifying whether the user identification is correct.

According to yet another aspect of the present disclosure, there is provided a computer-readable storage medium having computer-readable instructions stored thereon, which when executed by a computer, causes the computer to perform the method for cross-domain Internet of Things device registration in the above aspects of the present disclosure.

In the above aspects of the present disclosure, a method for cross-domain device registration is proposed, which realizes determination of a target device and access rights to the target device by using a user identification, thereby realizing information interaction between devices in different domains, and improving user experience.

BRIEF DESCRIPTION OF THE DRAWINGS

The foregoing and other objectives, features and advantages of the present disclosure will become more apparent from more detailed description of embodiments of the present disclosure in conjunction with accompanying drawings. The accompanying drawings are used to provide a further understanding of the embodiments of the present disclosure, constitute a part of this specification, and help to explain the present disclosure together with the embodiments of the present disclosure, but are not intended to act as a limitation of the present disclosure. In the accompanying drawings, like reference numerals usually indicate like components or steps.

FIG. 2 shows steps of a verification method for the device identification and/or device type according to an embodiment of the present disclosure.

FIG. 3 shows steps of a method for cross-domain Internet of Things device registration performed by a first Internet of Things device according to an embodiment of the present disclosure.

DESCRIPTION OF THE EMBODIMENTS

The technical solutions of the embodiments of the present disclosure will be clearly and thoroughly described below in conjunction with the accompanying drawings of the embodiments of the present disclosure. Obviously, the described embodiments are only a part but not all of the embodiments of the present disclosure. All other embodiments obtained by a person of ordinary skill in the art based on the embodiments of the present disclosure without creative labor shall fall within the scope of the present disclosure.

Flowcharts are used in the present disclosure to illustrate steps of methods according to the embodiments of the present disclosure. It should be understood that previous or subsequent steps are not necessarily performed exactly in sequence. Instead, various steps may be processed in a reverse order or simultaneously as needed. At the same time, other operations may be added to these processes, or a step or steps may be removed from these processes.

Internet of Things may be used as an extension of the Internet. It includes the Internet and all resources on the Internet, and is compatible with all Internet applications. With application of the Internet of Things technology in various fields, various new application fields such as a smart home, a retail service, a smart transportation, a smart health and the like have emerged.

For example, in a field of the Internet of Things, users may know information of what they put in the shopping cart when shopping outside, but they cannot immediately know storage information of their refrigerators or other equipment at home. In a case that users shopping outside want to know information of food stored in their refrigerators or other equipment at home, it is necessary to create cross-domain Internet of Things device registration for the users, so that the users can learn the information about their refrigerators at home. The present disclosure aims to solve the above-mentioned problem of cross-domain Internet of Things device registration.

Figure 1:
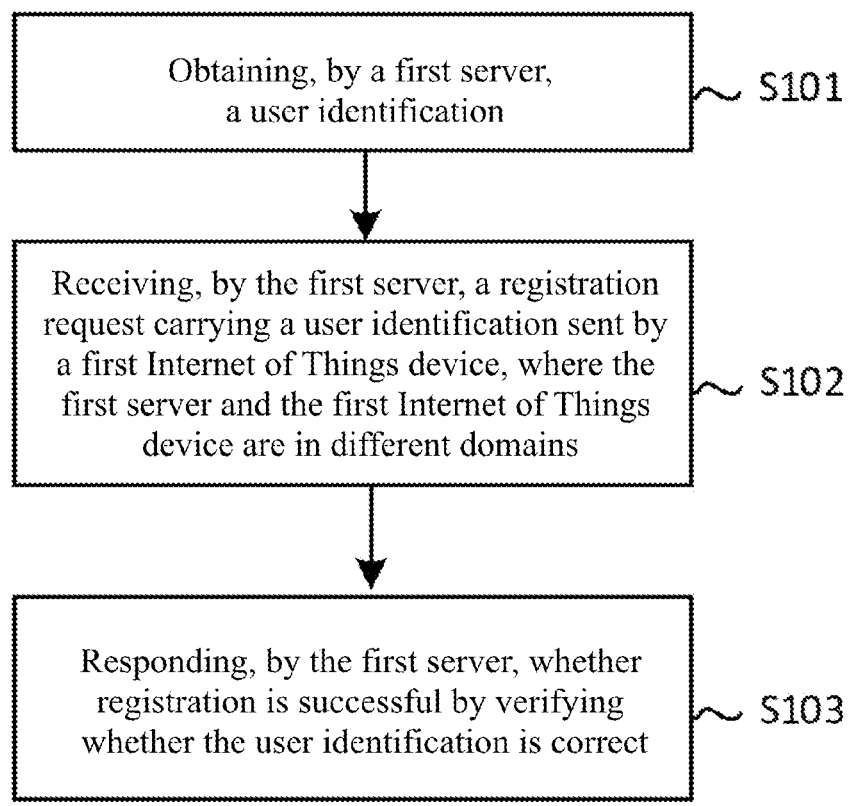
FIG. 1 shows steps of a method for cross-domain Internet of Things device registration performed by a first server according to an embodiment of the present disclosure.

A method for cross-domain Internet of Things device registration performed by a first server according to the embodiment of the present disclosure will be described with reference to FIG. 1. As shown in FIG. 1, in step S101, the first server obtains a user identification.

For example, the user identification is used to identify a user, and is preferably a user's physiological identification. For example, the user identification may be a facial feature identification, a fingerprint feature identification or the like.

For example, the first server may obtain the user identification about the user's password, face, fingerprint, etc., through the user's password registration, face recognition registration, fingerprint registration and the like, or may obtain the user identification from other servers.

In step S102, the first server receives a registration request carrying a user identification sent by a first Internet of Things device, and the first server and the first Internet of Things device are in different domains.

For example, the first server may be a smart home server in the smart home field, and various smart home devices may be registered thereon. For example, the first Internet of Things device may be a shopping cart, etc., which may be in the retail service field and may be registered with a retail server. The first server and the first Internet of Things device are in different domains, for example, the first Internet of Things device and the first server belong to different business systems, or the first server does not have device identification information, authentication information and the like of the first Internet of Things device and thus cannot directly authenticate the device.

The first server may receive the registration request carrying the user identification sent by the first Internet of Things device, before which, the first Internet of Things device firstly obtains the user identification through the user's password unlocking, face unlocking, fingerprint unlocking or the like.

In step S103, the first server may respond whether the registration is successful by verifying whether the user identification is correct.

For example, after the first server receives the registration request of the first Internet of Things device, the first server may compare the received user identification sent by the first Internet of Things device with the user identification obtained by the first server, and respond whether the registration is successful based on a result of the comparison. For example, the first server may obtain the user identification through user registration, while it should be appreciated that other feasible ways may also be used to obtain the user identification.

For example, when the received user identification sent by the first Internet of Things device is the same as the user identification obtained by the first server through user registration, the first server sends a response to the first Internet of Things device that the registration is successful; when the received user identification sent by the first Internet of Things device is different from the user identification obtained by the first server through user registration, the first server sends a response to the first Internet of Things device that the registration is unsuccessful.

For example, the first server may periodically or non-periodically obtain the user identification carried by the first Internet of Things device, compare the received user identification sent by the first Internet of Things device with the user identification obtained by the first server, and disconnect the first Internet of Things device and the first server when there is a mismatch.

Furthermore, the registration request may also include a device identification and/or a device type, and the first server may determine a target device (that is, a device on the first server that the first Internet of Things device may access) associated with the first Internet of Things device according to the device identification and/or the device type. For example, the association relationship may be predetermined.

Table 1 shows types of the target device associated with the first Internet of Things device determined by the first server according to the device type. As shown in Table 1, for example, when a type of a requesting device (that is, a type of the first Internet of Things device) is transportation-type devices such as bicycles and the like, a predetermined type of the target device associated therewith is health-type devices such as treadmills and the like; when the type of the requesting device is health-type devices such as treadmills and the like, a predetermined type of the target device associated therewith is fitness-type devices such as elliptical machines and the like. The above association relationship of the target device is only an example, and the association relationship between the requesting device and the target device is not limited thereto, but there may be other suitable association relationships.

TABLE 1

| Type of Requesting Device | Association Relationship | Type of Target Device |
|---|---|---|
| Transportation-type devices (bicycles, etc.) | Associated | Health-type devices (treadmills, etc.) |
| Health-type devices (treadmills, etc.) | Associated | Fitness-type devices (elliptical machines, etc.) |
| Retail-type devices (shopping carts, etc.) | Associated | Refrigeration-type devices (refrigerators, freezers, etc.) |

In addition, the first server may also determine a user identification type according to the user identification, and determine an access right of the first Internet of Things device to the target device according to the user identification type. For example, when the user identification type is a living type identification such as a fingerprint and a human face, the request of the first Internet of Things device may be regarded as a short-term request, so the access right granted to the first Internet of Things device to the target device is read-only rights. As another example, when the user identification type is a non-living type identification such as a password, the request of the first Internet of Things device may be regarded as a long-term request, so the access right granted to the first Internet of Things device to the target device is read and write rights. It should be appreciated that the above method for determining access rights is only an example, and the method for determining access rights is not limited thereto. The access right of the first Internet of Things device to the target device may also be determined according to a determination of whether a business status is valid (for example, determination of whether shopping is over when the first Internet of Things device is a shopping cart), business scenarios and the like, which will not be repeatedly described herein.

Optionally, since the device identification and/or the device type included in the registration request sent by the first Internet of Things device may be forged, the first server may send a verification request for the device identification and/or the device type to a second server.

FIG. 2 shows steps of a verification method for the device identification according to the embodiments of the present disclosure. As shown in FIG. 2, in step S201, the first server sends a verification request for the device identification and/or the device type to a second server. In step S202, after all of the user identification, the device identification, and/or the device type are successfully verified, the first server responds that the registration is successful, where the second server and the first Internet of Things device are in a same domain.

As described above, for example, the first server may be a smart home server, and the second server may be a retail server. For example, since the device identification and/or the device type included in the registration request sent by the first Internet of Things device may be forged, the first server may send a verification request for the device identification and/or the device type to the second server, to verify whether the device identification and/or the device type is forged. When it is verified that the device identification and/or the device type is correct, and the user identification is also verified to be correct according to the method described above, the first server will respond that the registration is successful.

In addition, the first server may register with a user server, so that the user server establishes a registration resource including a first server identification and a first server access identification.

Furthermore, the registration resource may also include a second server identification and a second server access identification. Before the first server receives the registration request sent by the first Internet of Things device, the first server access identification is sent to the first Internet of Things device via the second server.

For example, by establishing registrations between the first server, the second server, and the user server, the first Internet of Things device may be enabled to obtain the first server access identification via the second server. As an example, the first server and the second server may register with the user server, and then the user server may obtain the registration resource including one or more of the first server identification, the first server access identification, the second server identification and the second server access identification. Next, before the first Internet of Things device sends a registration request to the first server, the first Internet of Things device sends, to the second server, a request to determine the first server access identification. Then, the second server requests the first server access identification from the user server, and the user server feeds back the first server access identification to the second server. Finally, the second server feeds back the first server access identification to the first Internet of Things device. With the above operations, it is realized the technical effect that the first device obtains the first server access identification via the second server.

Alternatively, before the first server receives the registration request sent by the first Internet of Things device, the first server access identification is sent to the first Internet of Things device.

For example, the first server access identification may be sent to the first Internet of Things device through a wearable device carried by the user. For example, the user's wearable device may be registered with information of the first server, and the information of the first server may be sent to the first Internet of Things device by the user selecting an option on the wearable device.

It should be appreciated that the foregoing method of obtaining the first server access identification is not limited thereto, and other feasible methods may also be adopted to obtain the first server access identification.

In summary, by registering with the first server, the first Internet of Things device may access information of devices registered on the first server, thereby realizing access to cross-domain devices.

After the method for cross-domain Internet of Things device registration performed by a first server according to the embodiments of the present disclosure described above, a method for cross-domain Internet of Things device registration performed by a first Internet of Things device according to the embodiments of the present disclosure will be described below with reference to FIG. 3.

As shown in FIG. 3, in step S301, the first Internet of Things device sends a registration request carrying a user identification to a first server. In step S302, after verification is successful, the first Internet of Things device receives a response sent by the first server that registration is successful, where the first server and the first Internet of Things device are in different domains.

For example, the first Internet of Things device may automatically obtain the user identification.

For example, the first Internet of Things device may be a shopping cart as described above, and the first server may be a smart home server as described above. At this time, if the user wants to know a storage status of smart devices at home when shopping outside using the shopping cart, it is required to register the shopping cart with a smart home server. After the registration is successful, the shopping cart may obtain a storage status of smart devices registered on the smart home server, thereby improving user experience.

Furthermore, the registration request may also include a device identification and/or a device type, so that the first server determines a target device associated with the first Internet of Things device according to the device identification and/or the device type. For example, the association relationship may be predetermined. By determining the target device, types of devices registered on the first server that can be accessed by the first Internet of Things device may be determined. For example, when a type of a requesting device (that is, a type of the first Internet of Things device) is transportation-type devices such as bicycles and the like, a predetermined type of the target device associated therewith is health-type devices such as treadmills and the like; when the type of the requesting device is the health-type devices such as treadmills and the like, a predetermined type of the target device associated therewith is fitness-type devices such as elliptical machines and the like. The above association relationship of the target device is only an example, and the association relationship between the requesting device and the target device is not limited thereto, but there may be other suitable association relationships.

In addition, before the first Internet of Things device sends the registration request to the first server, the first Internet of Things device obtains a first server access identification via a second server, where the second server and the first Internet of Things device are in a same domain.

For example, by establishing registrations between the first server, the second server, and the user server, the first Internet of Things device may be enabled to obtain the first server access identification via the second server. As an example, the first server and the second server may register with the user server, and then the user server may obtain a registration resource including one or more of a first server identification, the first server access identification, a second server identification and a second server access identification. Next, before the first Internet of Things device sends a registration request to the first server, the first Internet of Things device sends, to the second server, a request to determine the first server access identification. Then, the second server requests the first server access identification from the user server, and the user server feeds back the first server access identification to the second server. After obtaining the feedback, the second server feeds back the first server access identification to the first Internet of Things device, and thus the first Internet of Things device receiving the first server access identification via the second server is realized.

Alternatively, before the first Internet of Things device sends the registration request to the first server, the first Internet of Things device obtains the first server access identification.

For example, the first Internet of Things device may obtain the first server access identification through a wearable device carried by the user. For example, the user's wearable device may be registered with information of the first server, and the information of the first server may be sent to the first Internet of Things device by the user selecting an option on the wearable device.

It should be appreciated that the foregoing method of receiving the first server access identification is not limited thereto, and other feasible methods may also be adopted to receive the first server access identification.

In the field of Internet of Things, when the first Internet of Things device wants to access information of devices registered on the first server located in a different domain, it needs to register with the first server firstly, and only after the registration is obtained, the first Internet of Things device may access the information of the devices registered on the first server, that is, realize registered access to cross-domain devices. Embodiments of the method for cross-domain Internet of Things device registration according to the present disclosure will be described in detail below with reference to FIGS. 4-6.

First Embodiment

In the first embodiment, it is assumed that the user is shopping outside (he/she has a first Internet of Things device, a shopping cart, and the shopping cart may be registered in the retail server domain). During the shopping process, if the user wants to know storage information of his/her refrigerator at home (the second Internet of Things device), the shopping cart is required to be able to obtain the storage information of the refrigerator at home. One way to solve this problem is to enable the shopping cart to be registered in the smart home server domain where the refrigerator is located. This method for cross-domain Internet of Things device registration will be described in detail below with reference to the accompanying drawings.

Figure 4:
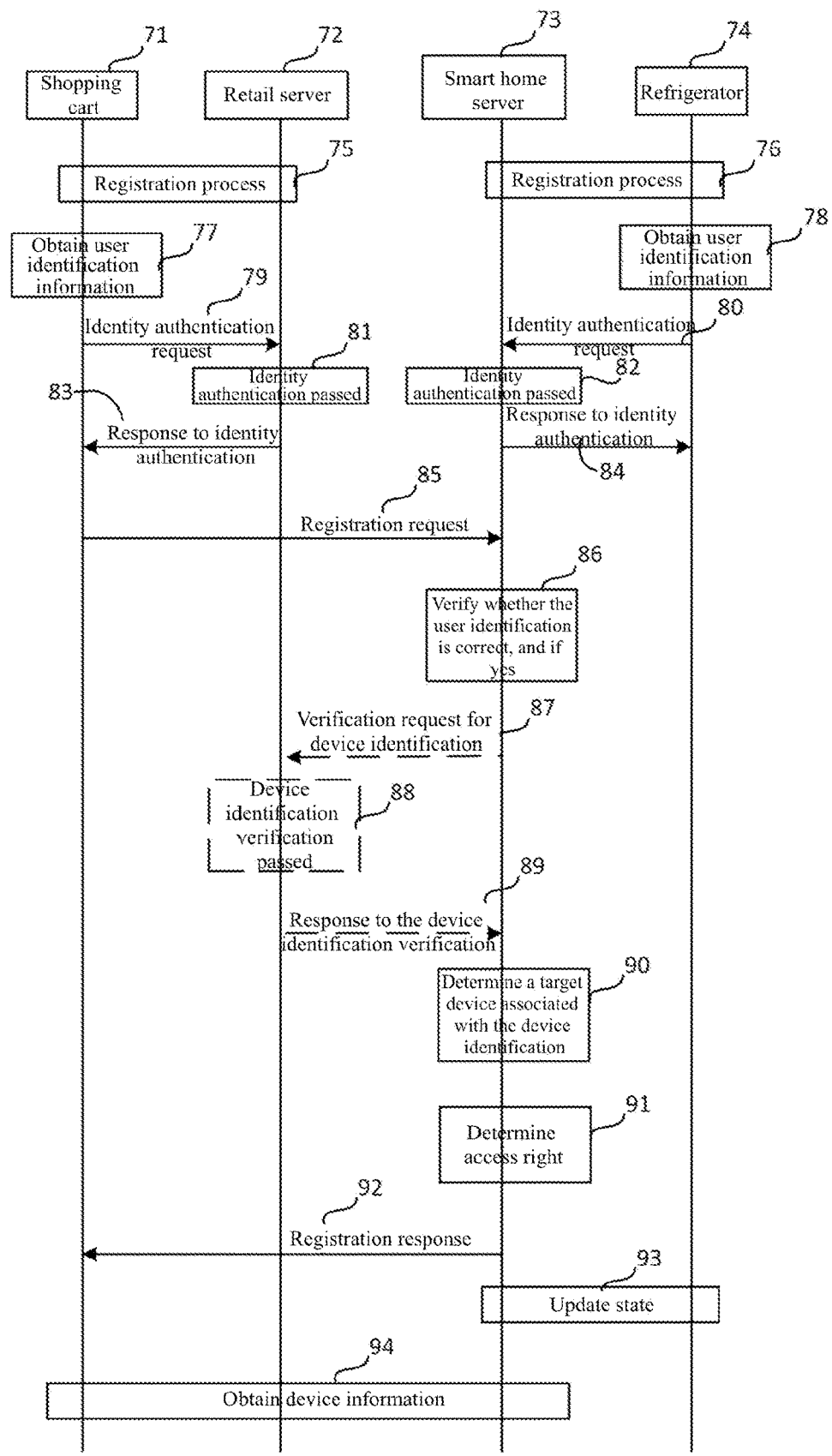
FIG. 4 shows a schematic diagram of a first embodiment of the method for cross-domain Internet of Things device registration according to the present disclosure.

FIG. 4 shows the first embodiment according to the present disclosure. As shown in FIG. 4, a smart home server 73 (that is, the aforementioned first server) and a refrigerator 74 are in a first domain, and a shopping cart 71 (that is, the aforementioned first Internet of Things device) and a retail server 72 (that is, the aforementioned second server) are in a second domain different from the first domain. In this embodiment, if the shopping cart 71 wants to access information of the refrigerator 74, it needs to register with the smart home server 73 firstly, and only after the registration is obtained, the shopping cart 71 may access the information of the refrigerator 74, that is, realize registered access to a cross-domain device.

The method for cross-domain Internet of Things device registration of the shopping cart 71 with the smart home server 73 will be described in detail below.

Referring to FIG. 4, the retail server 72 and the smart home server 73 first obtain user identifications (not shown) through user registration, respectively. Then, the shopping cart 71 may register 75 with the retail server 72, and the refrigerator 74 may register 76 with the smart home server 73; and then the shopping cart 71 and the refrigerator 74 may obtain user identification information 77, 78, respectively, through the user's password unlocking, face unlocking, fingerprint unlocking or the like.

Next, the shopping cart 71 sends an identity authentication request 79 to the retail server 72. The retail server 72 compares the received user identification sent by the shopping cart 71 with the user identification obtained through user registration, and responds 83 whether the identity authentication is successful or not according to a comparison result. For example, when the received user identification sent by the shopping cart 71 is the same as the user identification obtained through user registration, the retail server 72 sends a response to the shopping cart 71 that the identity authentication is successful; when the received user identification sent by the shopping cart 71 is different from the user identification obtained through user registration, the retail server 72 sends a response to the shopping cart 71 that the identity authentication is unsuccessful. Similarly, the refrigerator 74 may also send an identity authentication request 80 to the smart home server 73. The smart home server 73 compares the received user identification sent by the refrigerator 74 with the user identification obtained through user registration, and responds whether the identity authentication is successful or not according to a comparison result, which will not be repeatedly described herein.

After completing the registration and identity authentication of the shopping cart 71 with the retail server 72, the shopping cart 71 sends a registration request 85 to the smart home server 73, before which, the shopping cart 71 firstly obtains an access identification of the smart home server 73. For example, the shopping cart 71 may obtain the access identification of the retail server 72 through a wearable device carried by the user. In addition, the shopping cart 71 may also obtain the access identification of the retail server 72 through the method of the second embodiment as described in detail below.

Optionally, the registration request may include the user identification. For example, after the smart home server 73 receives the registration request of the shopping cart 71, the smart home server 73 may compare the received user identification sent by the shopping cart 71 with the user identification obtained by the smart home server 73 through user registration, and respond whether the registration is successful or not according to a comparison result.

In addition, the registration request may further include a device identification and/or a device type. Since the device identification and/or the device type included in the registration request sent by the shopping cart 71 may be forged, the smart home server 73 may send a verification request 87 for the device identification and/or the device type to the retail server 72, and the retail server 72 sends a response 89 to the device identification verification to the smart home server 73 by verifying whether the device identification and/or the device type is correct.

Furthermore, the smart home server 73 may determine a target device 90 associated with the shopping cart 71 according to the device identification. For example, the association relationship may be predetermined by a unified server.

For example, the shopping cart 71 is a device belonging to the retail type, and a type of the target device associated with the shopping cart 71 may be pre-determined as refrigerated-type devices such as refrigerators, freezers and the like. In addition, for example, when a type of a requesting device (that is, a type of the first Internet of Things device) is health-type devices such as treadmills and the like, a predetermined type of the target device associated therewith is fitness-type devices such as elliptical machines and the like.

In addition, the smart home server 73 may also determine a user identification type according to the user identification, and determine an access right 91 of the shopping cart 71 to the target device according to the user identification type.

For example, when the user identification type is a living type identification such as a fingerprint or a human face, the request of the shopping cart 71 may be regarded as a short-term request, so the access right granted to the shopping cart 71 to the target device is read-only rights. As another example, when the user identification type is a non-living identification such as a password, the request of the shopping cart 71 may be regarded as a long-term request, so the access right granted to the shopping cart 71 to the target device is read and write rights. It should be appreciated that the above method for determining access rights is only an example, and the method for determining access rights is not limited thereto. The access right of the shopping cart 71 to the target device may also be determined according to determination of whether a business status is valid (for example, determination of whether shopping is over or whether shopping is checked out), business scenarios and the like, which will not be repeatedly described herein.

After the user identification and the device identification are all successfully verified, the smart home server 73 responds 92 that the registration is successful.

Furthermore, since the status of the refrigerator 74 may change, the smart home server 73 may update the status 93 of the refrigerator 74 in real time.

In the case that the shopping cart 71 has successfully registered with the smart home server 73, the shopping cart 71 may obtain, for example, information 94 of the refrigerator 74 registered on the smart home server 73 via the smart home server 73, thereby realizing information interaction of cross-domain devices and improving user experience.

Second Embodiment

For example, in addition to the shopping cart obtaining the access identification of the retail server through a wearable device carried by the user as mentioned in the first embodiment, the shopping cart 51 may also be enabled to obtain the access identification of the smart home server 54 via the retail server 52 by establishing registrations between the smart home server 54, the retail server 52 and the user server 53.

Figure 5:
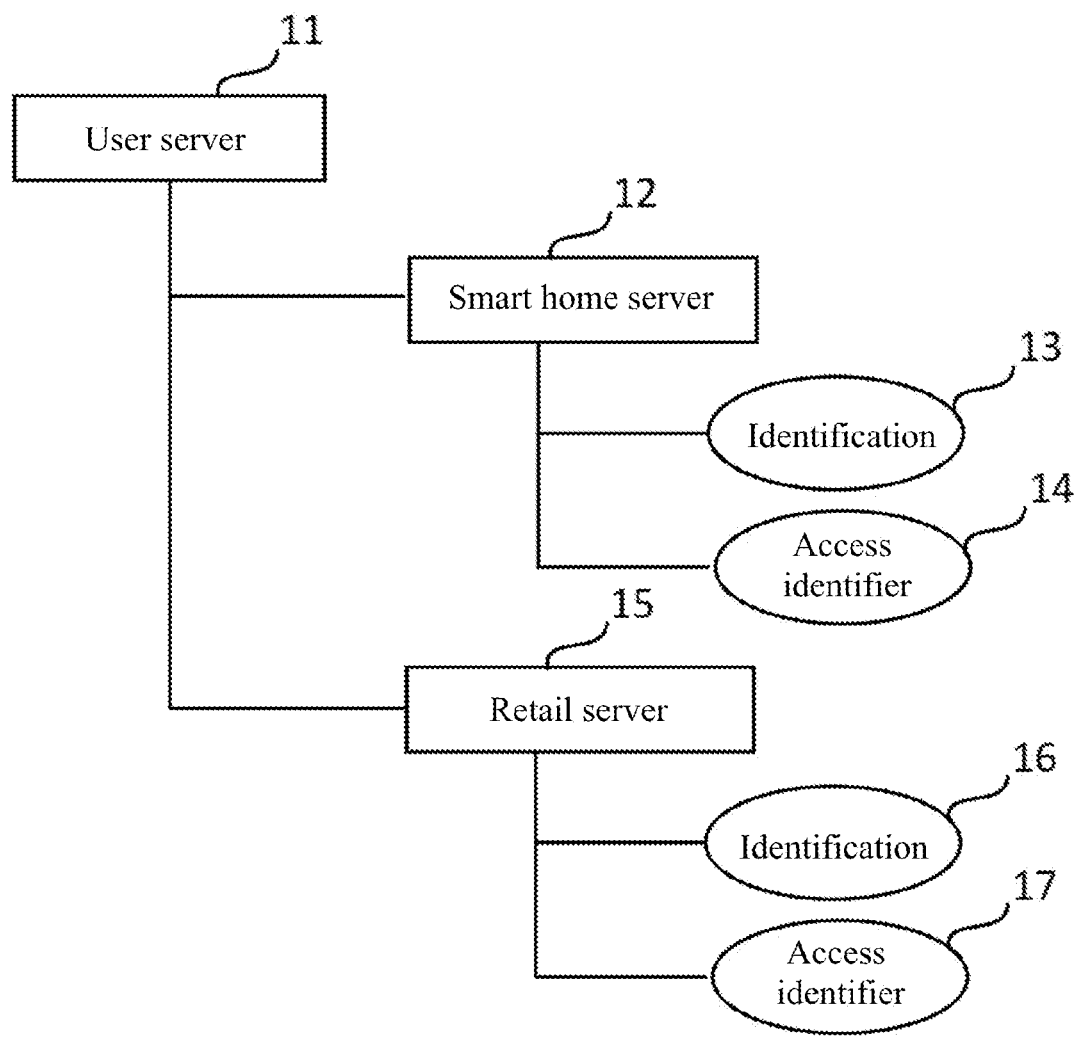
FIG. 5 shows a system configuration diagram of a second embodiment of the method for cross-domain Internet of Things device registration according to the present disclosure.

A system configuration of the second embodiment of the method for cross-domain Internet of Things device registration according to the present disclosure will be described below with reference to FIG. 5. As shown in FIG. 5, the system includes a first server (a smart home server 12 as shown in FIG. 5) and a second server (a retail server 15 as shown in FIG. 5) respectively located in two domains, and each server contains its own identification and access identifier (as shown in FIG. 5, the smart home server includes an identification 13 and an access identifier 14, and the retail server includes an identification 16 and an access identifier 17). Both the first server and the second server are registered with a user server 11 to realize cross-domain device registration, thereby determining a target device and access rights to the target device, realizing information interaction between devices in different domains, and improving user experience.

Figure 6:
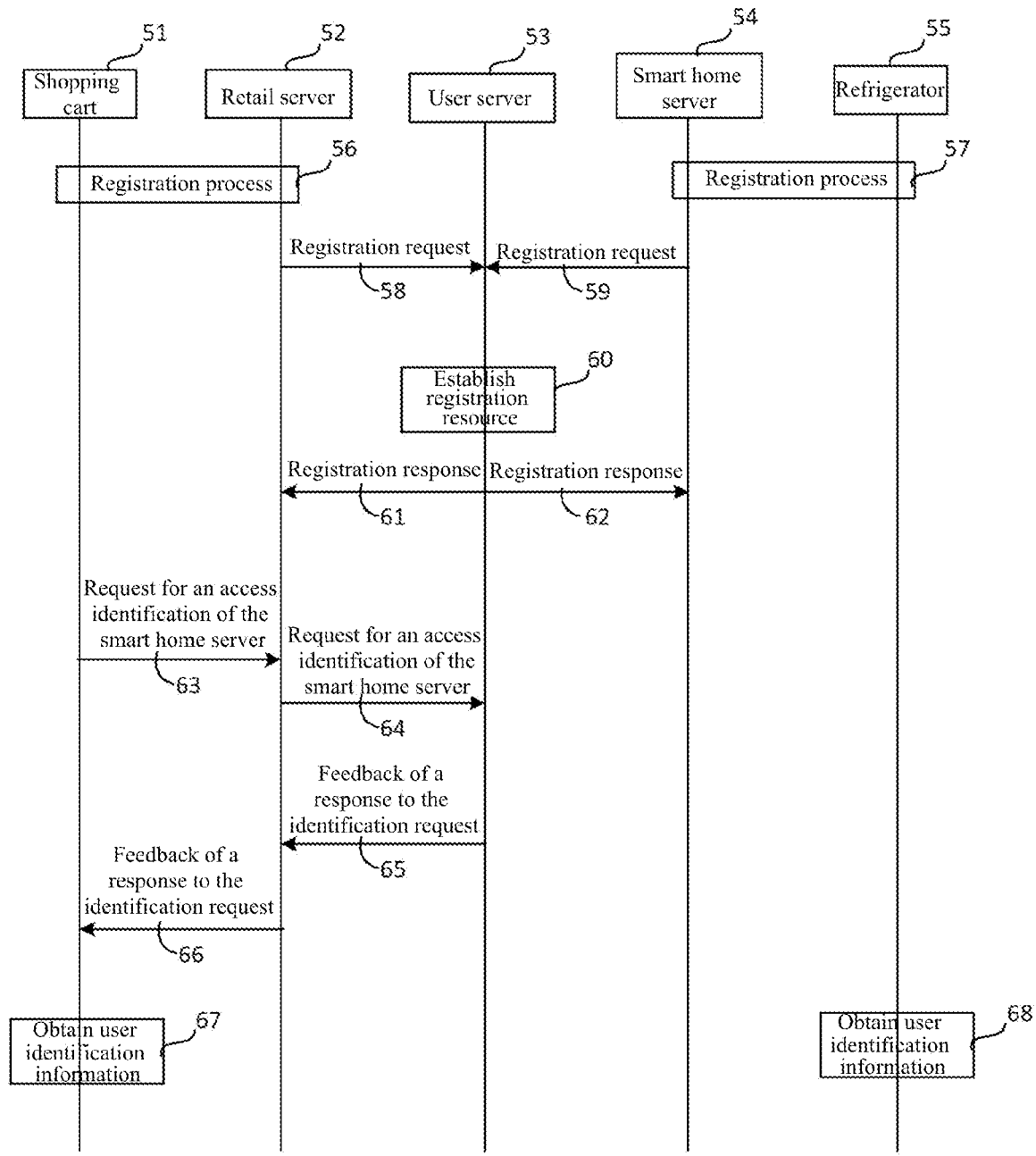
FIG. 6 shows a schematic diagram of the second embodiment of the method for cross-domain Internet of Things device registration according to the present disclosure.

FIG. 6 shows the second embodiment of the method for cross-domain Internet of Things device registration according to the present disclosure.

For example, similar to the first embodiment, firstly, the retail server 52 and the smart home server 54 obtain user identifications through user registration, respectively.

Then, the smart home server 54 and the retail server 52 may send registration requests 58, 59 to the user server 53, so that the user server 53 establishes a registration resource 60 including a smart home server identification, a smart home server access identification, a retail server identification, and a retail server access identification; then, the user server 53 sends registration responses 61, 62 to the smart home server 54 and the retail server 52.

Subsequently, before the shopping cart 51 sends the registration request to the smart home server 54, the shopping cart 51 sends, to the retail server 52, a request 63 to determine an access identification of the smart home server 54; then the retail server 52 requests the access identification 64 of the smart home server 54 from the user server 53, and receives a feedback 65 from the user server 53; and then the retail server 52 feeds back 66 the access identification of the smart home server 54 to the shopping cart 51, so that the shopping cart 51 obtains the access identification of the smart home server 54, to facilitate the shopping cart to send the registration request to the smart home server 54.

Next, the shopping cart 51 and the refrigerator 56 obtain the user identification information. The following steps are similar to those in the first embodiment, and will not be repeatedly described herein.

It can be seen that, in the above aspects of the present disclosure, a method for cross-domain device registration is proposed, which realizes determination of the target device and access rights to the target device through user identification, thereby realizing information interaction between devices in different domains, and improving user experience.

Figure 7:
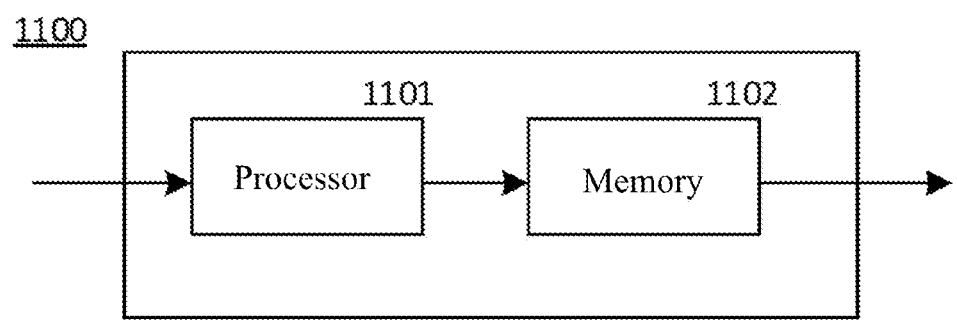
FIG. 7 shows a schematic diagram of an apparatus for cross-domain device registration according to an embodiment of the present disclosure.

An apparatus for cross-domain device registration according to the embodiments of the present disclosure will be described below with reference to FIG. 7. FIG. 7 is a schematic diagram of an apparatus for cross-domain device registration according to the embodiments of the present disclosure. Since the apparatus for cross-domain device registration of this embodiment has the same details as the method described above with reference to FIG. 1, a detailed description of the same content is omitted herein for the sake of simplicity.

As shown in FIG. 7, an apparatus 1100 for cross-domain device registration includes a processor 1101 and a memory 1102. It should be noted that although the apparatus 1100 for cross-domain device registration in FIG. 7 is shown as including only two apparatuses, this is only illustrative. The apparatus 1100 for cross-domain device registration may further include one or more other apparatuses, which are omitted herein because they are irrelevant to the inventive concept.

The apparatus 1100 for cross-domain device registration of the present disclosure includes: a processor 1101; and a memory 1102 having computer-readable program instructions stored therein, where when the computer-readable program instructions are executed by the processor, a method for cross-domain Internet of Things device registration is performed, and the method comprises: obtaining, by a first server, a user identification; receiving, by the first server, a registration request carrying a user identification sent by a first Internet of Things device, where the first server and the first Internet of Things device are in different domains; and responding, by the first server, whether registration is successful by verifying whether the user identification is correct.

For example, after the first server receives the registration request of the first Internet of Things device, the first server compares the received user identification sent by the first Internet of Things device with the user identification obtained by the first server, and responds whether the registration is successful according to a comparison result.

For example, the registration request may further include a device identification and/or a device type, and the first server determines a target device associated with the first Internet of Things device according to the device identification and/or the device type.

For example, the first server may decide a user identification type according to the user identification, and determines an access right of the first Internet of Things device to the target device according to the user identification type.

For example, the first server may send a verification request for the device identification and/or the device type to a second server, and the first server responds that the registration is successful after all of the user identification, the device identification, and/or the device type are successfully verified, where the second server and the first Internet of Things device are in a same domain.

For example, the first server may register with a user server, so that the user server establishes a registration resource including a first server identification and a first server access identification.

For example, the registration resource may further include a second server identification and a second server access identification, and the first server access identification may be sent to the first Internet of Things device via the second server before the first server receives the registration request sent by the first Internet of Things device.

For example, the first server access identification may be sent to the first Internet of Things device before the first server receives the registration request sent by the first Internet of Things device.

According to another aspect of the present disclosure, there is provided a computer-readable storage medium having computer-readable instructions stored thereon, which when executed by a computer, causes the computer to perform the method for cross-domain Internet of Things device registration in the above aspects of the present disclosure.

Those skilled in the art should appreciate that, various aspects of this application may be explained and described with several patentable categories or situations, including any new and useful process, machine, combination of product or substances, or any new and useful improvements to them. Accordingly, various aspects of the present application may be completely executed by hardware, completely executed by software (including firmware, resident software, microcode, etc.), or executed by a combination of hardware and software. The above hardware or software may all be referred to as "data block", "module", "engine", "unit", "component" or "system". In addition, various aspects of the present application may be embodied as a computer product located in one or more computer-readable media, and the product includes computer-readable program codes.

This application uses specific words to describe the embodiments of this application. For example, "one embodiment", "an embodiment", and/or "some embodiments" mean a certain feature, structure, or characteristic related to at least one embodiment of the present application. Therefore, it should be emphasized and noted that "an embodiment", "one embodiment" or "an alternative embodiment" mentioned twice or more in different positions of this specification does not necessarily refer to the same embodiment. In addition, some features, structures, or characteristics in one or more embodiments of the present application can be appropriately combined.

Unless otherwise defined, all terms (including technical and technology terms) used herein have the same meaning as commonly understood by those of ordinary skill in the art to which this disclosure belongs. It should also be understood that terms such as those defined in ordinary dictionaries should be interpreted as having meanings consistent with their meanings in the context of related technologies, and should not be interpreted in idealized or extremely formalized meanings, unless explicitly stated herein.

The above content is a description of the present disclosure, and should not be considered as a limitation to it. Although several exemplary embodiments of the present disclosure have been described, those skilled in the art will readily understand that many modifications may be made to the exemplary embodiments without departing from the novel teachings and advantages of the present disclosure. Therefore, all these modifications are intended to be included in the scope of the present disclosure defined by the claims. It should be understood that the above content is a description of the present disclosure and should not be considered as limited to the specific embodiments disclosed, and modifications to the disclosed embodiments and other embodiments are intended to be included in the scope of the appended claims. The present disclosure is defined by the claims and their equivalents.

What is claimed is:

1. A method for cross-domain Internet of Things device registration, comprising:
    obtaining, by a first server, a user identification, wherein the user identification includes user information;
    receiving, by the first server, a registration request carrying a user identification sent by a first Internet of Things device, wherein the first server and the first Internet of Things device are in different domains; and
    responding, by the first server, whether registration is successful by verifying whether the user identification is correct,
    wherein after the first server receives the registration request of the first Internet of Things device, the first server compares the received user identification sent by the first Internet of Things device with the user identification obtained by the first server, and responds whether the registration is successful according to a comparison result, and
    wherein the registration request further includes a device identification and/or a device type, and the first server determines a target device associated with the first Internet of Things device according to the device identification and/or the device type.

2. The method for cross-domain Internet of Things device registration according to claim 1, wherein:
    the first server decides a user identification type according to the user identification, and determines an access right of the first Internet of Things device to the target device according to the user identification type.

3. The method for cross-domain Internet of Things device registration according to claim 1, further comprising:
    sending, by the first server, a verification request for the device identification and/or the device type to a second server, and responding, by the first server, that the registration is successful after all of the user identification, the device identification, and/or the device type are successfully verified, wherein the second server and the first Internet of Things device are in a same domain.

4. The method for cross-domain Internet of Things device registration according to claim 1, wherein:
    the first server registers with a user server, so that the user server establishes a registration resource including a first server identification and a first server access identification.

5. The method for cross-domain Internet of Things device registration according to claim 4, wherein:
    the registration resource further includes a second server identification and a second server access identification, and the first server access identification is sent to the first Internet of Things device via the second server before the first server receives the registration request sent by the first Internet of Things device.

6. The method for cross-domain Internet of Things device registration according to claim 1, wherein:
    a first server access identification is sent to the first Internet of Things device before the first server receives the registration request sent by the first Internet of Things device.

7. The method for cross-domain Internet of Things device registration according to claim 1, further comprising:
    by the first server, periodically obtaining user identification carried by the first Internet of Things device, comparing the received user identification sent by the first Internet of Things device with the user identification obtained by the first server, and disconnecting the first Internet of Things device and the first server when there is a mismatch.

8. An apparatus for cross-domain Internet of Things device registration, comprising:
    a processor; and
    a memory having computer-readable program instructions stored therein,
    wherein when the computer-readable program instructions are executed by the processor, a method for cross-domain Internet of Things device registration is performed, and the method comprises:

obtaining, by a first server, a user identification, wherein the user identification includes user information;

receiving, by the first server, a registration request carrying a user identification sent by a first Internet of Things device, wherein the first server and the first Internet of Things device are in different domains; and responding, by the first server, whether registration is successful by verifying whether the user identification is correct, wherein after the first server receives the registration request of the first Internet of Things device, the first server compares the received user identification sent by the first Internet of Things device with the user identification obtained by the first server, and responds whether the registration is successful according to a comparison result, and wherein the registration request further includes a device identification and/or a device type, and the first server determines a target device associated with the first Internet of Things device according to the device identification and/or the device type.

9. The apparatus for cross-domain Internet of Things device registration according to claim 8, wherein:

the first server decides a user identification type according to the user identification, and determines an access right of the first Internet of Things device to the target device according to the user identification type.

10. The apparatus for cross-domain Internet of Things device registration according to claim 8, further comprising:

sending, by the first server, a verification request for the device identification and/or the device type to a second server, and responding, by the first server, that the registration is successful after all of the user identification, the device identification, and/or the device type are successfully verified, wherein the second server and the first Internet of Things device are in a same domain.

11. The apparatus for cross-domain Internet of Things device registration according to claim 8, wherein:

the first server registers with a user server, so that the user server establishes a registration resource including a first server identification and a first server access identification.

12. A non-transitory computer-readable storage medium having computer-readable instructions stored thereon, which when executed by a computer, causes the computer to perform the method for cross-domain Internet of Things device registration, the method comprising:

obtaining, by a first server, a user identification, wherein the user identification includes user information;

receiving, by the first server, a registration request carrying a user identification sent by a first Internet of Things device, wherein the first server and the first Internet of Things device are in different domains; and responding, by the first server, whether registration is successful by verifying whether the user identification is correct, wherein after the first server receives the registration request of the first Internet of Things device, the first server compares the received user identification sent by the first Internet of Things device with the user identification obtained by the first server, and responds whether the registration is successful according to a comparison result, and wherein the registration request further includes a device identification and/or a device type, and the first server determines a target device associated with the first Internet of Things device according to the device identification and/or the device type.

13. The apparatus for cross-domain Internet of Things device registration according to claim 11, wherein:

the registration resource further includes a second server identification and a second server access identification, and the first server access identification is sent to the first Internet of Things device via the second server before the first server receives the registration request sent by the first Internet of Things device.

14. The apparatus for cross-domain Internet of Things device registration according to claim 8, wherein:

a first server access identification is sent to the first Internet of Things device before the first server receives the registration request sent by the first Internet of Things device.

15. The apparatus for cross-domain Internet of Things device registration according to claim 8, further comprising:

by the first server, periodically obtaining user identification carried by the first Internet of Things device, comparing the received user identification sent by the first Internet of Things device with the user identification obtained by the first server, and disconnecting the first Internet of Things device and the first server when there is a mismatch.

\* \* \* \* \*